May 30, 1961  F. M. E. NOUVELET  2,985,900
WASHER AND SCREW ASSEMBLY MACHINE HAVING SCREW
INSERTER RESPONSIVE TO PRESSURE OF WASHER
Filed June 9, 1958  3 Sheets-Sheet 3
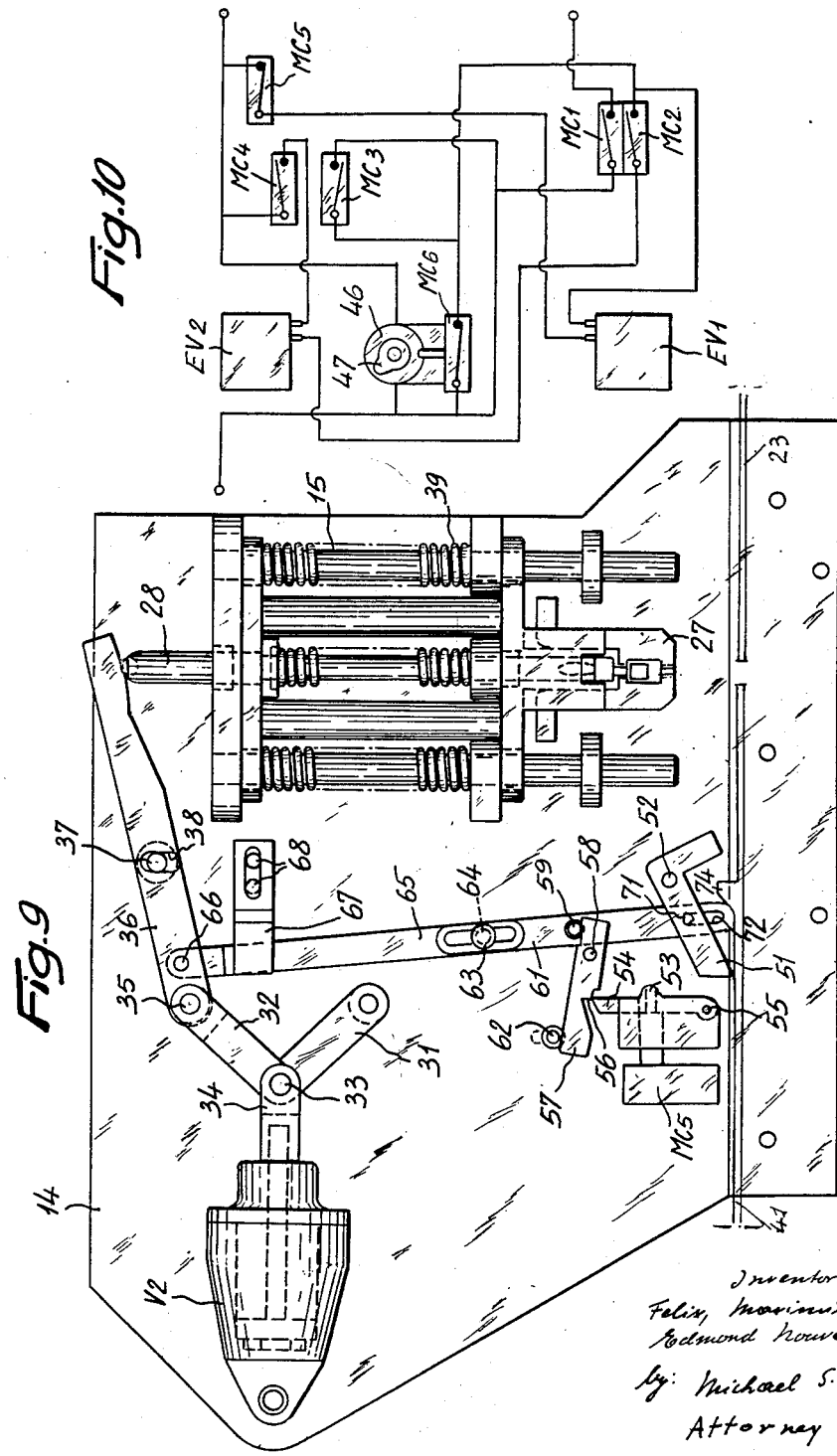

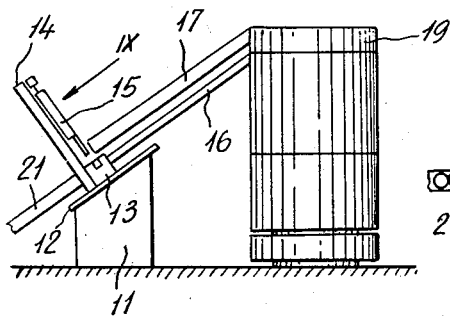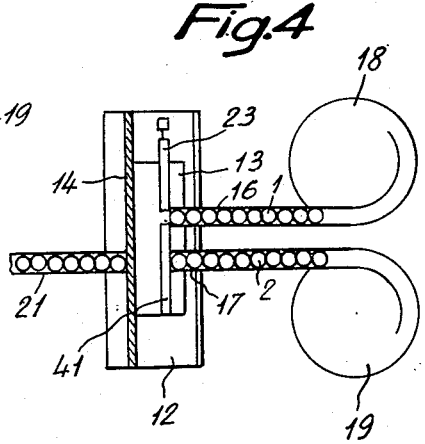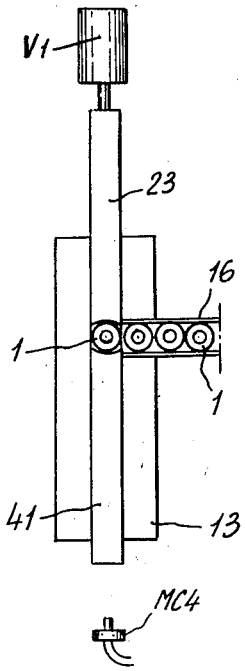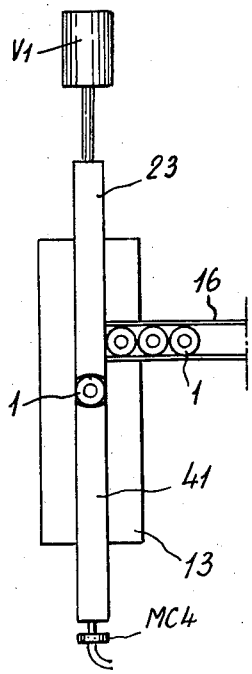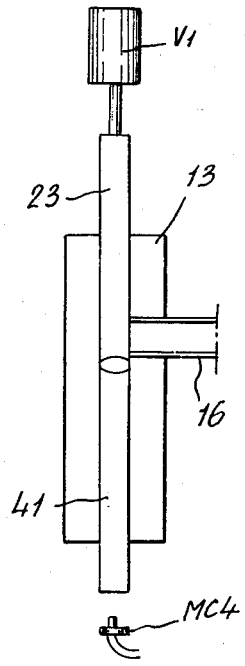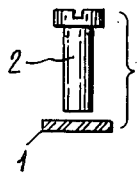

though a mechanism incorporating a toggle joint.

United States Patent Office 2,985,900
Patented May 30, 1961

2,985,900

WASHER AND SCREW ASSEMBLY MACHINE HAVING SCREW INSERTER RESPONSIVE TO PRESSURE OF WASHER

Felix Maximin Edmond Nouvelet, Paris, France, assignor to Gobin Daude S.A., Paris, France, a joint-stock company of France Filed June 9, 1958, Ser. No. 740,672

Claims priority, application France Mar. 19, 1958

10 Claims. (Cl. 10—155)

My invention has for its object a machine for the fitting and feeding of systems including each a screw blank inserted in a washer before it is introduced therewith into a rolling machine which is to form the thread.

My improved machine comprises in combination a frame, a distributor of screw blanks in which no threads are cut, a clamp adapted to engage the tip of each screw blank and to insert it in a washer, a washer distributor, a pusher member adapted to feed the successive washers underneath the blank inserting clamp, means for actuating said pusher member and means for operating said clamp under the control of a safety device designed in a manner such that the clamp may be operated only when the washer has been brought underneath it.

By reason of this structure, it is possible to feed a thread-cutting machine with complete systems constituted each by a washer and a screw blank without any possibility of feeding said thread-cutting machine with a screw blank which is not provided with a washer.

My invention has also for its object embodiments incorporating at least one of the following features:

(a) The safety device includes an auxiliary pusher member actuated by the washer fed by the cooperating first-mentioned pusher member.

(b) The two pusher members are arranged in alignment with each other inside a common slideway.

(c) The slideways feeding the washers and the screw blanks respectively open into last-mentioned slideway carrying the pusher member to one side of the latter, while an output slideway for the screw blank and washer systems opens also into the pusher member slideway on the other side of the latter and preferably in registry with the opening of the slideway feeding the screw blanks.

(d) The system including the slideways, the pusher members and the blank-inserting means slopes downwardly in the direction of progression of the compound screw blank and washer systems inside their slideway.

(e) The pusher member urging the washers forwardly and/or the blank-inserting clamp are actuated by a pneumatic jack under the control of an electrically controlled valve.

(f) The electrically controlled valve controlling the pneumatic jack actuating the blank-inserting clamp is fed by an electric circuit including a switch controlled by the auxiliary pusher member when shifted forwardly by a washer.

(g) The mechanism actuating the blank-inserting clamp includes a member adapted to slightly urge the auxiliary pusher member in a direction moving said auxiliary pusher member further away from the washer inside which is inserted a screw blank when said clamp reaches a point adjacent the end of its downward stroke, in order to release the compound system with a view to allowing its ejection.

(h) The jack actuating the clamp for the setting of the screw blank in position is connected with said clamp (i) The toggle joint is designed in a manner such that it enters a position slightly beyond its dead point when the clamp is moving downwardly, so that the latter may rise immediately by a small extent as soon as the compound system has been set in position with a view to releasing the head of the screw and to furthering its ejection.

(j) A blowing nozzle is arranged in the vicinity of the clamp, so as to further the ejection of the complete compound systems.

(k) The blowing nozzle is fed by the air exhausted by at least one of the above-mentioned pneumatic jacks, chiefly the jack actuating the pusher member for the washers.

(l) The operative cycle of the machine is ensured automatically by an electric circuit including switches actuated by the movable members of said machine, preferably under the control of an electric motor having a constant speed.

(m) A mechanism adapted to provide transient stoppage of the working of the machine operates as long as the output slideway for the compound systems is filled up to a predetermined level.

(n) The transient stopping mechanism includes an abutment rigid with the pusher member acting on the washers, said abutment engaging the tail ends of those screw blanks which reach said predetermined level inside the output slideway for the compound systems.

(o) Means for removing and recovering the washers fed to the machine whenever the screw blanks are lacking therefor are provided on the output slideway for the compound systems.

(p) The means for exhausting and recovering the separate washers which are not associated with screw blanks include a deflecting member adapted to occupy two positions on the output slideway for the compound parts, to wit: an inoperative position for which it lies in the path of the washers so as to make the latter drop laterally out of said slideway if they are not held therein by any screw blank and a transverse position for which it is shifted outside said path, so as to allow the compound systems to continue their downward movement along the slideway, said deflecting member being actuated in synchronism with the other parts of the machine, for instance by the transiently operating abutment of the stopping mechanism.

My invention will be more readily understood upon reading of the following description, reference being had to the accompanying drawings illustrating a preferred embodiment of my invention. In said drawings:

Fig. 1 shows, before their assembly, a washer and an unthreaded screw blank.

Fig. 2 shows the screw of Fig. 1 after the fitting of its washer and the formation of its thread through rolling.

Fig. 3 is a diagrammatic lateral view of a machine adapted to fit the screw blanks inside the washers according to my invention.

Fig. 4 is a plan view corresponding to Fig. 3 after removal of the means for fitting the screw blanks in the washers.

Figs. 5 and 6 show, for two different positions and on an enlarged scale, the means illustrated in Fig. 4 and adapted to shift the washers forward.

Fig. 7 shows the operation of the safety means for the washer shifting means according to Figs. 5 and 6.

Fig. 9 is a front view, also on a larger scale, of the means for inserting the screw blanks inside the washers, said view corresponding to the direction of the arrow IX of Fig. 3.

Fig. 10 is a wiring diagram for the machine.

Figure 8:
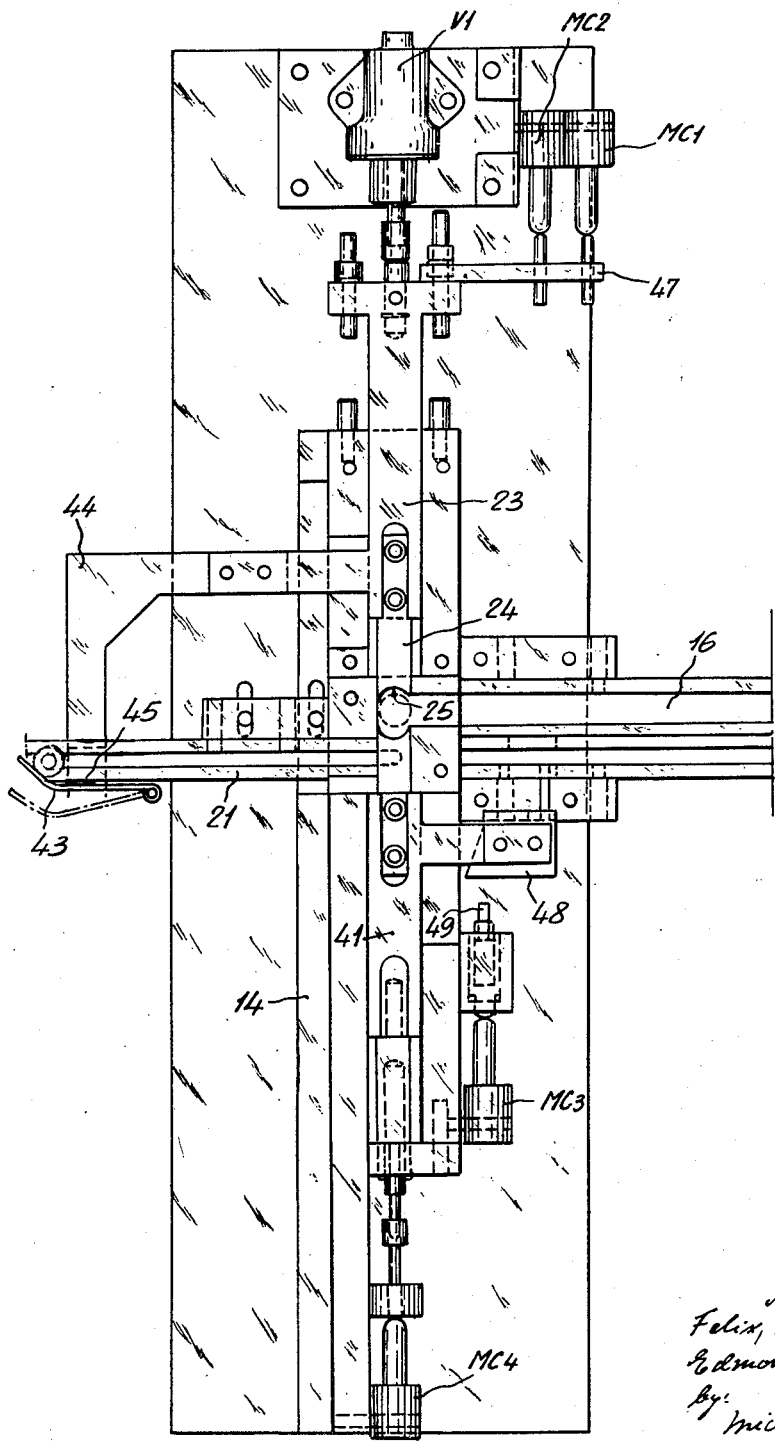
Fig. 8 shows a section of Fig. 4 on a much larger scale with a view to showing structural details.

Turning first to Fig. 1, it shows a washer 1 such as a braking member, provided with fins throughout its periphery and an unthreaded screw blank 2. The threads of the screw are to be obtained through rolling, i.e. through a machining which leads to a swelling of the blank. The diameter of the washer opening is selected in a manner such that it is possible to insert freely the washer over the screw blank, while, as soon as the screw thread is formed through rolling of said blank, the outer diameter of the threaded section of the screw reaches a value which is larger than that of the diameter of the washer opening, so that the latter can no longer move off the screw. This provides a compound screw and washer system, as illustrated in Fig. 2.

In Figs. 3 and 4, a machine is illustrated diagrammatically which ensures the preparation of compound systems including each the blank of an unthreaded screw fitted on a washer, said compound system being ready to be fed into a machine for the rolling of the screw thread. To a stand 11 is secured a plate 12, sloping along an angle of about 45° in the embodiment illustrated. The sloping plate 12 carries a distributing block 13 to which is secured in its turn a plate 14 carrying the mechanism inserting the screw blanks through the washers and designated as a whole by the reference number 15.

A slideway 16 guiding the washer and a further, parallel slideway 17 guiding the screw blanks are connected with the outputs of the corresponding arrangements 18 and 19 feeding the washers and the blanks, said arrangements being of any suitable conventional type. Both the slideways 16 and 17 open into the upper edge of the block 13 and in registry with the slideway 17 guiding the screw blanks, there is provided an output slideway 21 forming an output for the compound systems constituted by a screw blank and a washer. These three slideways assume the same slope as the plate 12, so that the different parts may progress readily under the action of gravity. The mechanism 15 inserting the screw blanks in the washers is located above the lower end of the slideway 17 feeding the screw blanks. The washers entering the block 13 over the slideway 16 are fed to said mechanism inserting the blanks in the washers through the agency of a sliding pusher member 23 shown more clearly in Figs. 5 and 6. Said pusher member is controlled by a pneumatic jack VI controlled by an electrically actuated valve EV1 which is not illustrated and is shown in a merely symbolical manner in the wiring diagram of Fig. 10. The pusher member 23 includes a jaw 24, the concave arcuate surface 25 of which is adapted to engage the edge of the washer to be urged forwardly.

The mechanism inserting the screw blanks inside the washers, which is designated as a whole by the reference number 15, is illustrated on a larger scale in Fig. 9; said mechanism is of any suitable conventional type and includes a clamp adapted to take hold of the screw blanks as illustrated at 27. It is controlled by a pneumatic jack V2 controlled in its turn by an electrically actuated valve EV2 which is also illustrated in a merely symbolical manner in the wiring diagram of Fig. 10. The connection between the piston 28 of the clamp 27 providing for the insertion of the blanks in the washers and the pneumatic jack includes a toggle joint of which an arm 31 is pivotally secured to a stud 31' fitted on the carrier plate 14 mentioned hereinabove and to a further stud 33 fitted on a strap 34 rigid with the operative rod of the jack V2 while the other arm 32 of the toggle link is also pivotally secured to the stud 33 at one end and at the other end to a stud 35 carried by the end of a lever 36 the other end of which engages the upper end of the piston 28 controlling the blank-inserting clamp. The lever 36 is pivotally secured at a point 37 of its length to the above mentioned plate 14 provided to this end with a slot 38 inside which the pivot formed at 37 extends.

The arrangement is such that when the jack V2 acts on the toggle link 31, 32 to shift the latter towards the right hand side of Fig. 9, this produces a downward movement of the piston 28 of the clamp 27, but when the toggle link is shifted slightly beyond its dead point, it provides at the end of its stroke for a slight rising of the clamp under the action of its return springs 39 so as to further the removal of the compound system disclosed hereinafter.

The electrically actuated valve V2 is energized by a switch MC4 (Figs. 4 to 8 and 10) which is controlled in its turn by an auxiliary pusher member 41 adapted to slide over the block 13 in alignment with the pusher-member 23. This forms a safety device since the washer 1 actuated by the pusher-member 23 urges outwardly in its turn the auxiliary pusher-member 41 which acts finally on the switch controlling the jack controlling the clamp (Fig. 6). If, for any reason whatever, the feeding of washers is subjected to a failure, the movement of the pusher-member 23 will no longer be transmitted to the auxiliary pusher-member 41 since there is no washer inserted between the two pusher members for actuating the latter. The blank-inserting clamp is therefore inoperative as long as the washers are not being fed.

In the opposite case, i.e. if the feeding of the blanks fails, the inserting clamp is idle and the washer is recovered at the output end of the machine without being fed to the thread-cutting machine. To this end, the output slideway 21 is provided with a spring 43 (Fig. 8) the incurved end of which extends into the path followed by the washers. On the other hand, a bell crank shaped member 44 impinges at each stroke of the pusher-member 23 against a stop 45 rigidly secured to the spring 43. Thus, during each cycle, the spring is urged away from the path of the washers and occupies transiently the position illustrated in dot and dash lines in Fig. 8.

During the normal operation of the machine, only complete compound systems including each a screw blank inserted in a washer are allowed to pass along the output slideway 21. The body of the screw is thus suspended inside the central slot of the slideway by the washer resting on the upper surface of said slideway and consequently, the spring 43 holds back each compound system thus guided by the screw body until it is urged away by the bell crank shaped member 44 at which moment the compound system continues progessing over the slideway 21.

As mentioned hereinabove, no blank can pass out of the machine without a washer since the lack of washers leads to a stoppage of the clamp serving for the insertion of the blanks. Therefore, only the output of washers without their blanks is to be considered. A washer engaging the output slideway 21 meets the oblique spring 43 which would shift it sideways since it would not be held back by a screw blank engaging the central slot of the slideway and it would therefore drop out to one side of the slideway into a collecing box without this leading to any disturbance in the operation of the machine.

The pusher-members 23 and 41 are urged towards their inoperative position which is that illustrated by the drawings by springs which are not illustrated and which push them towards corresponding stops.

The operation of the machine is ensured by a small electric motor 46 (Fig. 10) provided with a speed reducer and driving a cam 47 at a speed of 2 r.p.m.

The electric system includes six switches, to wit:

The switch MC1 fitted on the plate 12 (Fig. 8) is actuated by a projection 47 rigid with the pusher-member 23 so as to cut off the feeding of the electrically-actuated valve EV2 controlling the jack V2 operating the blank-inserting clamp. Said switch is open whenever the machine is inoperative.

The switch MC2 fitted to one side of the switch MC1 on the same plate 12 and actuated by the same projection 47 is adapted to provide for the maintenance of the current up to the end of each cycle. Said switch is also open when the machine is inoperative.

The switch MC3 also fitted in the plate 12 is actuated through the agency of the auxiliary piston-shaped sliding member by a projection 48 rigid with the auxiliary pusher member 41; said switch is open when the machine is inoperative and it serves for keeping the motor energized up to the end of the operative cycle.

The switch MC4 also carried by the plate 12 is actuated by the auxiliary pusher member 41; said switch is open when the machine is inoperative and is adapted to feed the electrically controlled valve EV2 controlling the jack V2 of the blank-inserting clamp.

The switch MC5 carried by the plate 14 (Fig. 9) is closed when the machine is at a standstill. It is controlled by a bell crank shaped lever 51 adapted to pivot round its apex 52 fitted on the plate 14. One arm of said lever abuts, when said lever rocks in a clockwise direction as shown in Fig. 9, against a boss 53 on a lever 54 pivotally secured at 55 to the plate 14 and engaging the piston-shaped member controlling the switch MC5. The free end of the lever 54 cooperates with a notch 56 on another lever 57 pivotally secured at 58 to the plate 14 and the other end of which may be urged downwardly by a stud 59 rigid with a rod 61. A stud 62 adjustably fitted in a vertical slot of the plate 14 serves as an abutment for the lever 57 in its opposite pivotal movement. The rod 61 is adjustably secured to an extension 65 through a bolt 64 slidingly engaging a slot 63 forming a further lever 65; the upper end of the latter is pivotally secured at 66 to the lever 36 and it is guided so as to move over the plate 14 by a bent lug 67 secured to said plate by two screws 68. When the toggle joint 31—32 is actuated, the rod 61 and lever 65 forming together a single link of an adjustable length move upwardly and raise the bell crank shaped lever 51 by reason of the connection of the latter with the rod 61 through the stud and slot connection 71—72, said bell crank shaped lever urges the lever 54 back and produces the opening of the switch MC5, said lever 54 engaging then the notch 56 in the lever 57. When the rod 61 returns downwardly, it carries along with it the bell crank shaped lever 51 but the switch MC5 remains in its open position in which it is held by the lever 54 until the moment at which the rod 61 reaches the end of its downwardly directed stroke. At this moment, the stud 59 provides for a rocking of the lever 57 which releases only then the lever 54 with reference to the notch 56; the switch MC5 closes again consequently only when the rod 61 and therefore the toggle link and the inserting clamp have reached the end of their inoperative stroke. The other arm of the bell crank shaped member 51 is adapted, at the end of the downward stroke of the screw-inserting clamp and chiefly at the beginning of its upward stroke, to urge the stop 74 rigid with the auxiliary pusher member 41 slightly aside, the latter being thus slightly shifted against the action of its return spring away from the edge of the washer which has urged it forwardly, whereby the subsequent ejection of the screw and washer system is furthered.

Lastly, the switch MC6 which is illustrated only in the wiring diagram of Fig. 10 is positioned on the motor 46 to be controlled by the cam 47 driven at a reduced speed by the latter and it is connected with the general current input terminals. It serves for resetting the machine for a further cycle when said machine has stopped by reason of a lack of washers. Said switch is closed when the machine is inoperative.

The machine also includes a conventional blank separator which is not illustrated and which is adapted to provide for the successive introduction of the screw blanks underneath the blank-inserting clamp. Said separator is actuated by the auxiliary pusher member 41, once during each cycle.

On the other hand, the air, passing out of the jack V1 controlling the washer-actuating pusher member during its receding movement, is directed laterally against the screw and washer system which furthers the ejection of the latter.

The operation of the machine is as follows: during normal operation, the current feeds the electrically controlled valve EV1, so that the pneumatic jack V1 is actuated and shifts the pusher member 23, which latter urges a washer 1 underneath the blank-inserting clamp 15. The washer 1 engages in its turn the auxiliary pusher member 41, so that the latter actuates the switch MC4. Current is then fed into the electrically controlled valve EV2, so that the pneumatic jack V2 provides for the downward movement of the screw blank into the washer which has just been fed into registry with the clamp. When the clamp has entered a position near the lower end of its stroke, the bell crank shaped lever 51 urges slightly the auxiliary pusher member back, so that the system constituted by the screw blank and the washer is actually released and may be readily ejected; at the same time, the bell crank shaped lever 51 allows the switch MC5 to open and, consequently, provides for the breaking of the circuit controlling the electrically controlled valve EV1. Thus, the pusher member 23 adapted to shift the washers forwardly is shifted rearwardly under the action of its return spring, while the air passing out of the jack VI is fed into the ejector, as disclosed hereinabove. At the same time, the projection 47 on the pusher member provides for the feeding of the electrically controlled valve EV2 through the switch MC1 and the jack V2 urges thereupon the clamp into its operative position. This being done and when the blank-inserting clamp rises again at the end of its operative stroke, it restores through the closing of the switch MC5 the circuit feeding the electrically controlled valve EV1 which starts a further cycle of operation.

In the case of a lack of washers, and as mentioned hereinabove, the auxiliary pusher member is not actuated nor is, consequently, the switch MC4 and, in this case, the switch MC6 carried by the motor is operative as soon as the cam 47 passes in registry therewith so as to open the circuit of the electrically controlled valve EV1 actuating the jack V1, whereupon the pusher member 23 is urged rearwardly so as to be ready to push a further washer forwardly.

As concerns the possibility of a lack of screw blanks, it has been mentioned that, when the feeding of washers is performed normally, the operation of the machine is also normal whereas any washer not carrying a blank is thrust out of the machine by the spring 43. The switch MC2 inserted in parallel with the starting switch prevents the stoppage of the machine otherwise than at the end of a stroke. The switch MC3 inserted in parallel with the switch MC6 prevents the cam 47 from breaking the circuit during normal operation.

Furthermore, and as apparent from the preceding disclosure, the rhythm of the machine is defined by the automatic succession of the different operative stages and the screw and washer systems are fed in succession into the output slideway 21 which leads them to the machine forming the screw threads through a rolling action.

In order that the thread-forming machine may always be sufficiently fed, the rhythm of the machine inserting the screw blanks into the washers is adjusted to a value slightly higher than the operative speed of the thread-forming machine, and there is provided an arrangement for transiently stopping the production of the blank-inserting machine, as soon as the channel feeding the thread-forming machine is full, which means that the output slideway of the screw-inserting machine is also full. Said stoppage of the machine is obtained simply by means of the bell crank shaped member 44 illustrated in Fig. 8 and the free end of which abuts against the tail ends of the screw blanks whenever the upper section of the slideway 21 is full and, under such conditions, the pneumatic jack V1 does not provide for the progression of the pusher member 23 acting on the washers, which pusher member is held fast by the member 44 carried by it; consequently, the blank-inserting machine stops feeding. It is started again when the excess number of prepared blank and washer systems have been absorbed by the thread-forming machine, said restarting being ensured by the switch MC6, as in the case of a lack of washers.

Obviously, the invention is not limited to the embodiment disclosed and illustrated and various modifications may be brought thereto, as will be readily understood by anyone skilled in the art, without unduly widening the scope of the invention as defined in the accompanying claims.

Thus, instead of rendering the machine inserting the screw blanks inside the washers completely autonomous, so that it must be stopped transiently when its yield is too high, it is possible to control said machine through means including, for instance, a rotary cam driven by the thread-forming machine in a manner such that each time the latter forms a thread on a screw, the blank-inserting machine feeds the thread-forming machine with a compound blank and washer system.

What I claim is:

1. A machine for preparing compound systems constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member, a slideway over which the pusher member urges the successive washers out of their distributor into operative registry with the clamp, an auxiliary pusher member adapted to be pushed along said slideway by the successive washers urged over the latter by the first-mentioned pusher member, elastic means urging said auxiliary pusher member back towards the washers, means controlling the movements of the first-mentioned pusher member, means for actuating said blank-inserting clamp, a releaser for said clamp actuating means, said releaser being actuated by said auxiliary pusher member only when the same is pushed along by a washer and means over which the blank-carrying washers are conveyed beyond the clamp and out of the machine.

2. A machine for preparing compound systems constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member, a slideway over which the pusher member urges the successive washers out of their distributor into operative registry with the clamp, an auxiliary pusher member adapted to be pushed along said slideway by the successive washers urged over the latter by the first-mentioned pusher member, the pusher members being recessed to match the shape of the washers at their ends facing the latter, elastic means urging said auxiliary pusher member back towards the washers, means controlling the movements of the first-mentioned pusher member, means for actuating said blank-inserting clamp, a releaser for said clamp actuating means, said releaser being actuated by said auxiliary pusher member only when the same is pushed along by a washer and means over which the blank-carrying washers are conveyed beyond the clamp and out of the machine.

3. A machine for preparing compound systems constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member, a slideway over which the pusher member urges the successive washers out of their distributor into operative registry with the clamp, an auxiliary pusher member adapted to be pushed along said slideway by the successive washers urged over the latter by the first-mentioned pusher member, elastic means urging said auxiliary pusher member back towards the washers, means controlilng the movements of the first-mentioned pusher member, a further slideway over which the blanks are guided from their distributor towards the clamp, means for actuating said blank-inserting clamp, a releaser for said clamp actuating means, said releaser being actuated by said auxiliary pusher member only when the same is pushed along by a washer and an output slideway over which the first-mentioned slideways open to either side thereof and in transverse registry with each other.

4. A machine for preparing compound systems constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member, a downwardly sloping slideway over which the pusher member urges the successive washers out of their distributor into operative registry with the clamp, an auxiliary pusher member adapted to be pushed along said slideway by the successive washers urged over the latter by the first mentioned pusher member, elastic means urging said auxiliary pusher member back towards the washers, means controlling the movements of the first-mentioned pusher member, a further downwardly sloping slideway over which the blanks are guided from their distributor towards the clamp, means for actuating said blank-inserting clamp, a releaser for said clamp actuating means, said releaser being actuated by said auxiliary pusher member only when the same is pushed along by a washer and a downwardly sloping output slideway over which the first mentioned slideways open to either side thereof and in transverse registry with each other.

5. A machine for preparing compound systems constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member urging the successive washers out of their distributor into operative registry with the clamp, pneumatic jacks actuating the pusher member and the clamp, electrically energized valves controlling the operation of said jacks, actuating means for operation of the one electrically operated valve controlling the pneumatic jack actuating the clamp, said actuating means including a member located in the path of a washer fed by said pusher member so as to actuate said one valve only when a washer is fed by said pusher member in registry with said clamp and means over which the blank-carrying washers are conveyed beyond the clamp and out of the machine.

6. A machine for preparing compound systems, constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member urging the successive washers out of their distributor into operative registry with the clamp, pneumatic jacks actuating the pusher member and the clamp, electrically energized valves controlling the operation of said jacks, an electric circuit energizing the valve controlling the pneumatic jack actuating the clamp, a switch adapted to open said circuit, an auxiliary pusher member adapted to be urged forwardly in operative engagement with said switch only by the successive washers and operating said switch each time a washer is actually urged forwardly by the first-mentioned pusher-member and means over which the washers carrying the blanks, inserted in them are removed from the clamp.

7. A machine for preparing compound systems, constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member urging the successive washers out of their distributor into operative registry with the clamp, means controlling the movement of said pusher member, a jack, a toggle joint operatively connecting said jack with the clamp, actuating means for actuating operation of said jack and including a member located in the path of a washer fed by said pusher member so as to actuate said jack only when a washer is fed by said pusher member in registry with said clamp and means over which the blank-carrying washers are conveyed beyond the clamp and out of the machine.

8. A machine for preparing compound systems, constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member urging the successive washers out of their distributor into operative registry with the clamp, means controlling the movement of said pusher member, a jack, a toggle joint operatively connecting said jack with the clamp as it executes a stroke through a dead point to urge the clamp into its operative position and thereafter to return said clamp back slightly at the end of its stroke beyond said dead point, actuating means for actuating operation of said jack and including a member located in the path of a washer fed by said pusher member so as to actuate said jack only when a washer is fed by said pusher member in registry with said clamp and means over which the blank-carrying washers are conveyed beyond the clamp and out of the machine.

9. A machine for preparing compound systems, constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member, a slideway over which the pusher member urges the successive washers out of their distributor into operative registry with the clamp, an auxiliary pusher member adapted to be pushed along said slideway by the successive washers urged over the latter by the first-mentined pusher member, elastic means urging said auxiliary pusher member back towards the washers, means controlling the movements of the first-mentioned pusher member, a further slideway over which the blanks are guided from their distributor towards the clamp, means for actuating said blank-inserting clamp, a releaser for said clamp actuating means, said releaser being actuated by said auxiliary pusher member only when the same is pushed along by a washer, an output slideway over which the first-mentioned slideways open to either side thereof and in transverse registry with each other, and a stopping mechanism adapted to transiently cut off the operation of the machine whenever the output slideway is filled with washer and blank systems above a predetermined level.

10. A machine for preparing compound systems, constituted by screw blanks fitted in washers prior to the rolling of the threads on the blanks in thread-forming means, comprising a distributor of screw blanks, a distributor of washers, a clamp adapted to engage the successive screw blanks fed by the first-mentioned distributor and to insert them into the corresponding successive washers fed by the washer distributor, a reciprocatory pusher member, a slideway over which the pusher member urges the successive washers out of their distributor into operative registry with the clamp, an auxiliary pusher member adapted to be pushed along said slideway by the successive washers urged over the latter by the first-mentioned pusher member, elastic means urging said auxiliary pusher member back towards the washers, means controlling the movements of the first-mentioned pusher member, a further slideway over which the blanks are guided from their distributor towards the clamp, means for actuating said blank-inserting clamp, a member urging slightly the auxiliary pusher member away from the washer whenever the clamp is nearing the end of its operative stroke to provide for release of the blank and washer system assembled by the clamp, a releaser for said clamp actuating means, said releaser being actuated by said auxiliary pusher member only when the same is pushed along by a washer, an output slideway over which the first-mentioned slideways open to either side thereof and in transverse registry with each other, a stopping mechanism adapted to transiently cut off the operation of the machine whenever the output slideway is filled with washer and blank systems above a predetermined level, said mechanism including a projection carried by the first-mentioned pusher member and adapted to engage and to be held fast by the tail ends of the blanks of said systems lying above said predetermined level, thereby to prevent further actuation of the auxiliary pusher member.

References Cited in the file of this patent

UNITED STATES PATENTS

| | | |
|---|---|---|
| 480,530 | Tobey | Aug. 9, 1892 |
| 1,893,428 | McDonald | Jan. 3, 1933 |
| 2,284,690 | Stern | June 2, 1942 |
| 2,803,377 | Wilson | Aug. 20, 1957 |